United States Patent
Jurzak et al.

(10) Patent No.: US 10,757,536 B2
(45) Date of Patent: Aug. 25, 2020

(54) METHOD AND APPARATUS FOR SETTING GEOFENCE BOUNDARIES

(71) Applicant: MOTOROLA SOLUTIONS, INC, Chicago, IL (US)

(72) Inventors: Pawel Jurzak, Cracow (PL); Bogdan Janusz Stepien, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/308,493

(22) PCT Filed: Jul. 8, 2016

(86) PCT No.: PCT/PL2016/050031
§ 371 (c)(1),
(2) Date: Dec. 10, 2018

(87) PCT Pub. No.: WO2018/009083
PCT Pub. Date: Jan. 11, 2018

(65) Prior Publication Data
US 2019/0158979 A1    May 23, 2019

(51) Int. Cl.
*H04W 24/00* (2009.01)
*H04W 4/02* (2018.01)
*H04W 4/021* (2018.01)
*H04W 8/00* (2009.01)
*H04W 4/90* (2018.01)
*H04L 29/08* (2006.01)
*H04W 4/10* (2009.01)
*H04W 68/00* (2009.01)
*H04W 4/80* (2018.01)

(52) U.S. Cl.
CPC ............. *H04W 4/022* (2013.01); *H04L 67/18* (2013.01); *H04W 4/023* (2013.01); *H04W 4/025* (2013.01); *H04W 4/10* (2013.01); *H04W 4/90* (2018.02); *H04W 8/005* (2013.01); *H04W 68/005* (2013.01); *H04L 67/306* (2013.01); *H04W 4/80* (2018.02)

(58) Field of Classification Search
CPC ..... H04W 4/022; H04W 68/005; H04W 4/10; H04W 4/025; H04W 8/005; H04W 4/023; H04W 4/90; H04W 4/80; H04L 67/18; H04L 67/306
USPC ...................................... 455/456.1
See application file for complete search history.

(56) References Cited

U.S. PATENT DOCUMENTS 8,941,489 B2   1/2015   Sheshadri et al.
9,167,381 B2   10/2015  McDonald et al.
9,210,545 B2   12/2015  Sabatelli et al.
(Continued)

FOREIGN PATENT DOCUMENTS

WO    2015080925 A1    6/2015

OTHER PUBLICATIONS

The International Search Report and the W Ritten Opinion corresponding serial No. PCT/PL2016/050031 filed Jul. 8, 2016, all pages.

*Primary Examiner* — Rafael Pérez-Gutiérrez
*Assistant Examiner* — Mark G. Pannell

(57) ABSTRACT

A method and apparatus for setting geofence boundaries are provided herein. More particularly, geofence boundaries are set on a per-person basis, and based on a type of equipment in proximity to the person for whom the geofence boundary is being set.

15 Claims, 4 Drawing Sheets

(56) References Cited

U.S. PATENT DOCUMENTS

| | | |
|---|---|---|
| 9,269,260 B2 | 2/2016 | Lampert et al. |
| 9,432,806 B2 | 8/2016 | Zises |
| 2008/0154691 A1* | 6/2008 | Wellman ............ G06Q 10/0639 |
| | | 705/7.26 |
| 2013/0099977 A1 | 4/2013 | Sheshadri et al. |
| 2013/0324160 A1* | 12/2013 | Sabatellil .............. H04W 4/022 |
| | | 455/456.3 |
| 2014/0242947 A1 | 8/2014 | Ali et al. |
| 2014/0256357 A1 | 9/2014 | Wang et al. |
| 2015/0199704 A1* | 7/2015 | Gottesman ......... G06Q 30/0226 |
| | | 705/14.27 |
| 2015/0199896 A1 | 7/2015 | Estes et al. |
| 2015/0245189 A1 | 8/2015 | Nalluri et al. |
| 2015/0288819 A1* | 10/2015 | Brown ................. H04M 3/5116 |
| | | 379/45 |
| 2015/0296276 A1* | 10/2015 | Umetani .................. H04Q 9/00 |
| | | 340/870.07 |
| 2015/0350351 A1* | 12/2015 | Tung ...................... H04L 67/18 |
| | | 709/204 |
| 2016/0063780 A1* | 3/2016 | Logan ...................... G07C 9/22 |
| | | 340/5.61 |
| 2016/0065629 A1* | 3/2016 | Emoff .................. H04L 65/403 |
| | | 715/753 |
| 2016/0260313 A1* | 9/2016 | Thorpe .................. G08B 21/24 |
| 2017/0311131 A1* | 10/2017 | South ...................... H04W 4/30 |
| 2018/0012470 A1* | 1/2018 | Kritzler ................. G06Q 10/00 |

* cited by examiner

METHOD AND APPARATUS FOR SETTING GEOFENCE BOUNDARIES

This application is a National Stage filing under 35 USC § 371 of co-pending Patent Cooperation Treaty international application having Serial No. PCT/PL2016/050031 (the 'PCT international application') filed on Jul. 8, 2016. This application claims priority to the PCT international application, the entire contents of which are incorporated herein by reference.

FIELD OF THE INVENTION

The present invention generally relates to geofences, and in particular, to setting a geofence boundary based on a type of equipment.

RELATED APPLICATIONS

The present invention is related to co-pending patent application no. (PCT/US16/64567), entitled METHOD AND APPARATUS FOR SETTING GEOFENCE BOUNDARIES.

BACKGROUND OF THE INVENTION

Many public safety or other private or government wireless communication systems provide for group-based radio communications amongst a plurality of radios (subscriber units). During the formation of a group, all radios within the group will share certain radio parameters (e.g., channel, alerts, . . . , etc). In certain situations, important alerts may need to be provided to the group or groups operating in a particular defined area. For example, at a mining site, events such as blasting operations impart unique alerting requirements on the wireless communication system and subscriber devices operating therein in preparation for, and perhaps during, a blasting operation. In other situations, a group or groups of subscriber devices may need to be alerted about events such as hazardous material leaks, high crime, or weather alerts relative to a particular defined area. Other examples are possible as well.

In order to address the above, a geofence may be created that defines a particular area of interest. Those units within the geofence may have their radios operate in a similar manner (e.g., all tune to the same channel, all receive the same alerts, . . . , etc.) regardless of the infrastructure equipment being utilized. In addition, units that cross a geofence boundary may be notified that the boundary has been crossed.

A problem exists when unwanted or irrelevant actions occur too frequently due to multiple crossings of geofence boundaries. For example, consider a dangerous zone in a city where a police officer should be alerted when entering this zone. However if a police officer has certain equipment, the risk is lower, so applying this geofence and alerting all officers may be unnecessary, especially when alerts are received frequently. Therefore a need exists for a method and apparatus for setting geofence boundaries that alleviates the above-mentioned problem.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
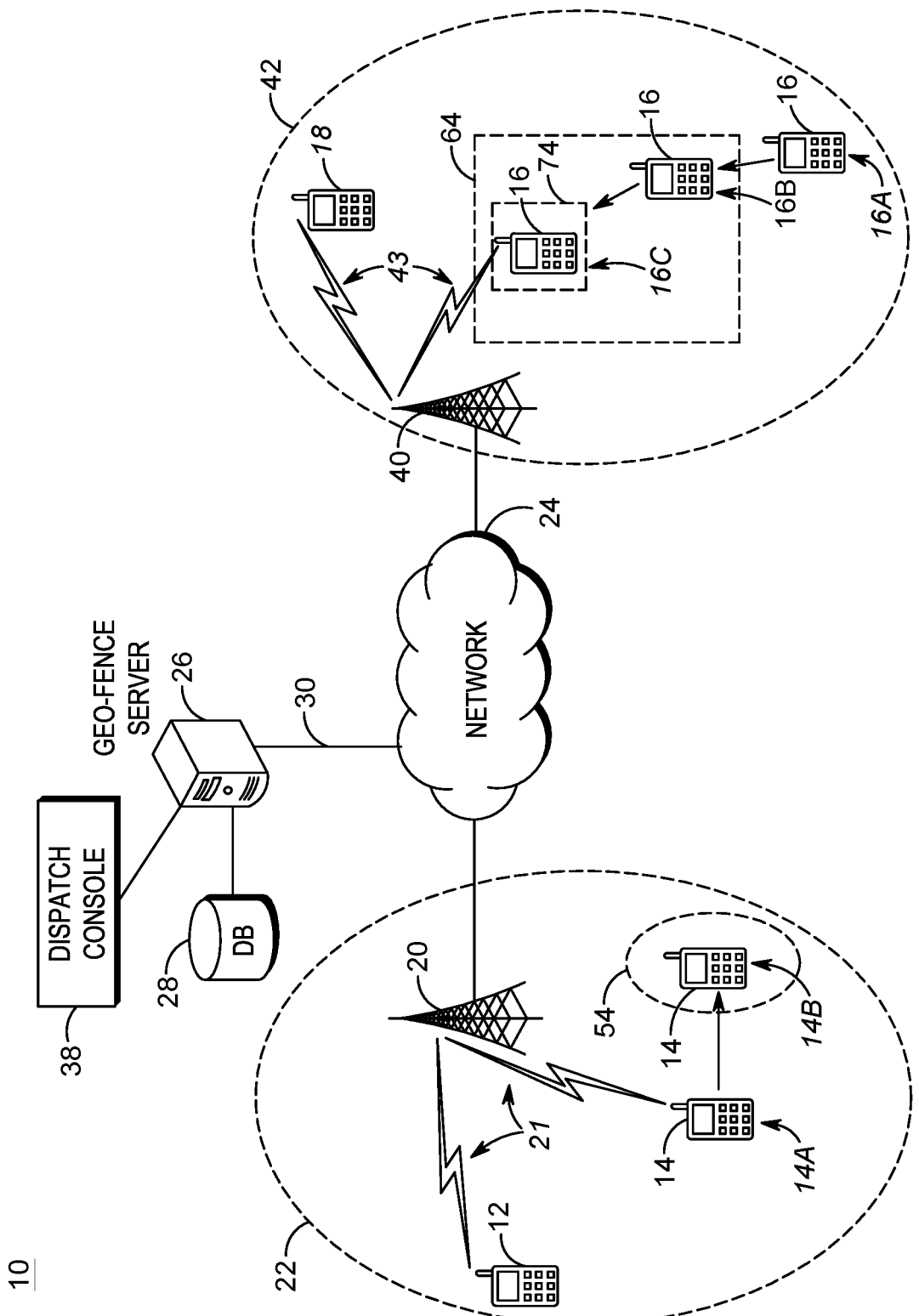
FIG. 1 is a block diagram of a wireless communications network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to address the above-mentioned need, a method and apparatus for setting geofence boundaries are provided herein. More particularly, geofence boundaries are set on a per-person basis, and based on a type and/or an amount of equipment in proximity to the person for whom the geofence boundary is being set.

In particular, a geofence server will determine a geofence boundary that is tailored specifically to each individual, the boundary for the individual being based on types (or amount) of equipment within the vicinity of the individual. By setting geofence boundaries as described above, the geofence server can reduce an amount of unwanted messaging transmitted to individuals.

As an example consider a dangerous region, for example, due to a poisonous gas leak. A geofence around the region may be defined that has a particular boundary for each public-safety officer that is based on whether or not a gas mask is present with the officer. More particularly, a public-safety officer who has no gas mask can be assigned a geofence boundary that is much farther from the region than an officer who has a gas mask. In this manner, the officer with the gas mask will not receive unnecessary messaging when farther from the region.

In another example, consider a dangerous zone in the city center due to high crime. A police officer is in a car has a risk that is lower compared to an officer on foot (no car), so applying this geo-fence and alerting such users in a car may be burdensome.

It should be noted that the above description was given with a user receiving a warning or alert when they crossed a geofence boundary, however, any parameter may be modified when crossing a geofence boundary. Such parameters include, but are not limited to:

Channel change;

Emergency configuration—an emergency mode enabled for elevated privileges. For example moving the radio to a command channel in an emergency;

Voice Announcements/Alerts/Visual mode indicators;

Status/Message information shared back to system;

Covert—vehicle operating modes (lights/sirens/etc); and/or

Power level—reduce power when is blasting or hazardous areas.

FIG. 1 illustrates a communications network 10 including client radios (subscriber devices) 12, 14, 16, 18, fixed terminals 20, 40 (e.g. base stations), wireless links 21, 43, backhaul network 24, geofence server 26, database 28, communications connections 30, 32, 36, and dispatch console 38. Each base station 20, 40 has at least one radio transmitter covering a radio coverage cell (22, 42). One or several radios 12, 14, 16, 18 within radio coverage cells 22, 42 of the respective base stations 20, 40 may connect to the base stations 20, 40 using a wireless communication protocol via respective wireless links 21, 43. The radios 12, 14, 16, 18 may communicate with each other, and perhaps other devices accessible via other network links, using a group communications protocol over wireless links 21, 43. Wireless links 21, 43 may be, for example, a wireless link supporting a protocol such as GPRS or UMTS, 2G, (e.g. GSM), 3G (e.g. WCDMA or LTE), iDEN, wireless LAN (WLAN), or ETSI Digital Mobile Radio (DMR), among other possibilities. The radios 12, 14, 16, 18 may be configured with an identification reference (such as an IMSI, International Mobile Subscriber Identity, or an SUID, Subscriber Unit Identifier) which may be connected to a physical media (such as a SIM card, Subscriber Identity Module).

Each radio 12, 14, 16, 18 may be a group communications device, such as a push-to-talk (PTT) device, that is normally maintained in a monitor only mode, and which switches to a transmit-only mode (half-duplex) or transmit and receive mode (full-duplex) upon depression or activation of a PTT input switch. The group communications architecture in communications network 10 allows a single radio, such as radio 14, to communicate with one or more members (such as radios 12, 16-18) associated with a particular group of radios at the same time. Radios 12, 14, 16, 18, base stations 20, 40, and/or an infrastructure controller (not shown) may cooperate to define groups of radios and enable the one-to-many communications feature provided by communications network 10. As radios are mobile, they may move within, into, out of, and/or between radio coverage cells 22, 42. For example, radio 14 may move from an initial location 14A within radio coverage cell 22 to a subsequent location 14B also within radio coverage cell 22. Similarly, radio 16 may move from an initial location 16A outside of radio coverage cell 42 to a secondary location 16B within radio coverage cell 42, and then to a final location 16C also within radio coverage cell 42.

Although only four radios and two base stations are illustrated in FIG. 1, the present disclosure is not limited as such, and more or fewer radios and more or fewer base stations could be used in any particular implementation. Furthermore, while a single geofence server 26 is illustrated in FIG. 1, more than one geofence server 26 may be used and/or a distributed geofence server 26 may be used that divides functions across multiple devices, perhaps for load balancing reasons. Finally, while database 28 is illustrated as directly coupled to geofence server 26, database 28 may also be remote from geofence server 26 and accessible to geofence server 26 via one or more of network 24 and/or external networks 34.

The base stations 20, 40 may be linked to the geofence server 26 via network 24 and communications connection 30. Network 24 may comprise one or more routers, switches, LANs, WLANs, WANs, access points, or other network infrastructure. For example, geofence server 26 may be accessible to base stations 20, 40 via a dedicated wireline or via the Internet. In one example, base stations 20, 40 may be directly coupled to geofence server 26 via one or more internal links under control of a single communications network provider.

Geofence server 26 may be a separate device or may lie internal other network equipment. Server 26 is configured to maintain a database of geofences and groups of radios desiring communications with each other. As mentioned above, a radio group maintained by server 26 may not necessarily be within a geofence. The groups/geofences maintained are within one or more radio coverage cells of one or more base stations with which it is associated, and may provide mechanisms and/or interfaces for activating or de-activating existing geofences and groups it is maintaining, for adding new geofence/group definitions, and for deleting existing geofence/group definitions. Geofence server 26 may also comprise an application running at the dispatch center (dispatch console 38). The geofence server 26 may further maintain mappings that identify, for each active geofence in the database, a corresponding assigned radio configuration (e.g., an alert for playback by a radio when the radio enters or otherwise finds itself within the geofence). The geofence server 26 may further provide mechanisms and/or interfaces for modifying assigned radio parameters in the mapping, for adding a new mapping that assigns an existing geofence definition to associated radio parameters, and for removing an existing mapping. In other embodiments, geofence server 26 may be embodied within or coupled to another network device, such as a base station controller (BSC), mobile switching center (MSC), site controller, zone controller, Push-to-Talk controller, or other network device, inside network 24 or outside of network 24.

Geofence server 26 may be fed location updates for all radios and propagate radio parameters to the radios based on their location within one or more geofences. In another embodiment, server 26 may simply provide geofence radio parameters and boundary information to each radio, and have the radios themselves provide warnings when crossing geofence boundaries, and/or change parameters as necessary.

Database 28 may function to store geofence and group definitions, radio parameters for each geofence/group, and mappings and provide them, upon request, to geofence server 26. For example, database 28 may store a first geofence definition (area of operation and radio parameters) defining a first geofence 54 within radio coverage cell 22 and associated with base station 20, a second geofence definition defining a second geofence 64 that is partially within radio coverage cell 42 and associated with base station 42 (and perhaps another, adjacent base station, not shown), and a third geofence definition defining a third geofence 74 that is within (e.g., a sub-region of) geofence 64 and radio coverage cell 42 and is also associated with base station 40.

Server 26 may also store group parameters for those radios not necessarily within a geofence, but desire communications among the radios. Geofence definitions may be unique to each radio/individual and include a set of three or more polygon vertices, where each polygon vertex is a GPS coordinate, such as latitude and longitude pair, or some other form of cartographic definition. Additionally or alternatively, geofence definitions may include a point and radius, where the radius is a distance criterion and the point is a GPS coordinate (which may be in motion), such as a latitude and longitude pair, or some other form of cartographic definition. Further, geofence definitions may include of a set of two diagonally opposing rectangular vertices, where each rectangular vertex is a GPS coordinate (which may be in motion), such as a latitude and longitude pair, or some other form of cartographic definition. Other possibilities exist as well.

Communications system 10 may implement, in one embodiment, a narrow-band trunked radio communication system in which radios 12, 14, 16, 18 transmit control and data messages in accordance with an air interface protocol such as that defined by the ETSI Digital Mobile Radio (DMR), Terrestrial Trunked Radio (TETRA), or Association of Public-Safety Communications Officials 25 (APCO P25) standards. In a trunked radio communication system, frequencies are assigned for talk group use on an as-needed basis, and signaling over a control channel is used to direct radios to a particular channel to receive a particular group communication. In another embodiment, communications system 10 may implement a PTT over Cellular (OMA-PoC) or PTT over IP (PoIP) broadband architecture in which radios 12, 14, 16, 18 transmit control and data messages in accordance with a protocol such as real-time transport protocol (RTP) and/or session initiation protocol (SIP). Other possibilities exist as well.

Dispatch console 38 lies within a dispatch center (not shown) and may be directly coupled to geofence server 26 as shown, or may be indirectly coupled to geofence server 26 via one or more of network 24 and external networks 34. The dispatch console 38 may provide an administrative or dispatch access to radios 12, 14, 16, 18 and geofence server 26, and allow an administrator or dispatcher to initiate infrastructure-sourced group communications to groups of radios 12, 14, 16, 18, among other features and functions.

Figure 2:
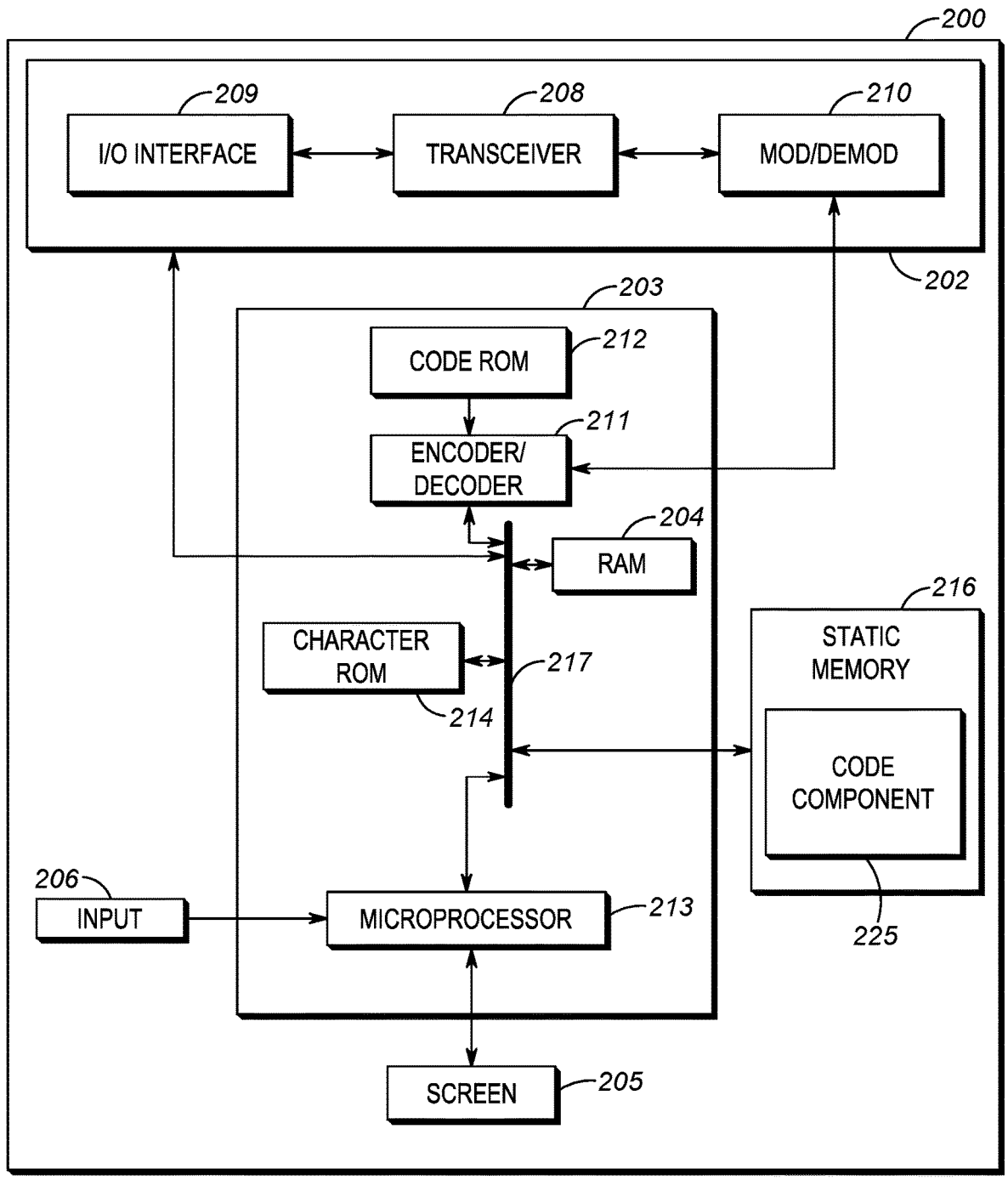
FIG. 2 is a block diagram of a geofence server in accordance with some embodiments.

Referring to FIG. 2, a schematic diagram illustrates a geofence server 200 according to some embodiments of the present disclosure. Geofence server 200 may be, for example, the same as or similar to the geofence server 26 of FIG. 1. As shown in FIG. 2, geofence server 200 includes a communications unit 202 coupled to a common data and address bus 217 of a processing unit 203. The geofence server 200 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for encoding and decoding voice, data, control, or other signals transmitted or received by geofence server 200. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with BSs such as BSs 20, 40 of FIG. 1, with other devices in the communications network 10, and/or with the dispatch console 38. The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 202 may alternatively or additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding or encoding data such as control channel messages and/or data or voice messages that may be transmitted or received by the geofence server 200. Static memory 216 may store operating code 225 for the microprocessor 213 that, when executed, performs one or more of the steps described with respect to changing geofence boundaries as described below. Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

Determining a Geofence Boundary for a Particular Person

As discussed above, a particular geofence surrounding an area will have a boundary that changes for each individual. In order to accomplish this task, processor 213 may simply use a discrete number of boundaries (e.g., three different boundaries). These boundaries may be stored in database 28 as part of a geofence definition. A first boundary may apply to individuals lacking particular equipment, while a second boundary may apply to individuals having particular equipment (a first plurality of equipment). Finally, a third boundary may apply to individuals having additional equipment (a second plurality of equipment). As an example, the first boundary may apply to those lacking a gas mask, while the second boundary may apply to those having a gas mask, while the third boundary may apply to those having both a gas mask and a hazardous gas detector.

In another embodiment of the present invention, the geofence boundary can have any number of locations that are based on nearby equipment. In this particular example, the following parameters are utilized:

Geofence power—a numerical parameter that can be calculated at any location inside a geofence. The number changes based on location within the geofence. The geofence power will typically be higher in the center of the geofenced area and decreases with distance from the center. It can be dynamically updated depending on contextual data (e.g. gunshot detected, hazardous gas detected, . . . , etc).

User resistance—a numerical parameter given to a user that indicates how much the user is resistant to the geofence. As an example, those individuals with a first set of equipment nearby may have a high resistance when compared to those with no equipment nearby. The geofence boundary will be at a point where the user resistance equals the geofence power.

The following parameters (along with others) can be taken into account when assigning resistance for particular user:
whether or not the user is in possession of a gas mask;
whether or not the user is in possession of a bulletproof jacket;
whether or not the user is in possession of a vehicle;
whether or not the user is in possession of particular hazardous monitoring equipment (e.g., a radioactivity detector, a hazardous gas detector, . . . , etc.).

Both the geofence power and individual resistance may be stored in database 28 as part of a geofence definition. With the above two parameters in mind, a geofence boundary is considered as crossed by a user when user's resistance is lower than geofence power at particular location. More particularly, a geofence boundary will exist for a particular user at a point where resistance=power. If resistance<power, then geofence parameters are applied (e.g., a warning is given, a channel is changed, . . . , etc.)

Figure 3:
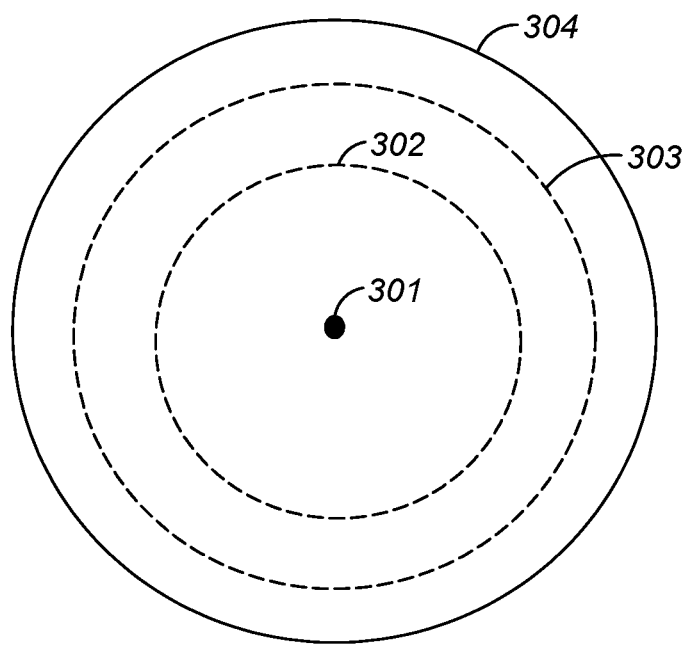
FIG. 3 illustrates setting a geofence boundary.

This is illustrated in FIG. 3. In FIG. 3, point 301 represents a particular area or incident. For example, a high-crime area or building. At point/area 301, a geofence power will be given a first value (e.g., 100) and will decrease in proportion to distance from point/area 301 such that it falls to zero at circle 304. The decrease is preferably linear, so that ½ way between point 301 and 304 (e.g., at circle 302), the geofence power will be ½ of what it is at the center. Likewise, at circle 303, which is, say, 75% the distance between points 301 and 304, the geofence power will be 75% less than what it is at point 301.

With FIG. 3 in mind, assume that the geofence power is 100 at point 301, 50 at circle 302, 25 at circle 303, and 0 at circle 304. If an individual has a user resistance of, say 25, then the geofence boundary would be set at circle 303. Likewise, if another individual has a resistance of say 50, then the geofence boundary for that individual will be set at circle 302.

In a preferred embodiment of the present invention, an individual's resistance is a function of a number and/or type of nearby equipment. (Nearby equipment may be determined by accessing a database to determine any equipment assigned to a user). Thus, $$\text{Resistance}=F(\text{nearby equipment}).$$

With this in mind, a first person may have a resistance of 10 if they have no equipment nearby (e.g., no gas mask, no bullet-proof vest, . . . , etc.), 50 if they have a gas mask in their possession, and 75 if they have a gas mask and a hazardous material detector in their possession. Because of this, individuals with gas masks, for example, will need to get closer to point 301 prior to crossing a geofence boundary.

As discussed above, having equipment nearby is assumed for an individual if the individual is assigned the equipment for a shift. In another embodiment of the present invention, location data may be obtained on all equipment (for example equipment may possess a GPS receiver and report its location, and all users may possess GPS equipment and report their location), and equipment is assumed nearby if an individual is within a certain predetermined distance (e.g., 5 meters). In yet further embodiments of the present invention other techniques may be utilized to determine if a person is in possession of equipment. For example, short-range wireless protocols may be used to determine if equipment is in proximity to the user. It can be assumed that equipment is nearby if the equipment is detectable via short-range wireless communication, or if the equipment belongs to the user's PAN created using one of the short range protocols.

Expanding on the above, next-generation public safety officers will be equipped with devices that determine various physical and environmental conditions surrounding the public-safety officer. These conditions are generally reported back to a dispatch operator so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer of the future will have an array of shelved devices available to the officer at the beginning of a shift. The officer will select the devices off the shelf, and form a personal area network (PAN) with the devices that will accompany the officer on his shift. Devices within the PAN may be reported to a geofence server. For example, the officer may pull a gun-draw sensor, a body-worn camera, a wireless microphone, a smart watch, a police radio, a man-down sensor, a gas mask, . . . , etc. All devices pulled by the officer will be configured to form a PAN by associating (pairing) with each other and communicating wirelessly among the devices and to any geofence server or dispatch center. The detection of nearby devices may comprise the detection of devices within a PAN.

With the above in mind, geofence server comprises a receiver (transceiver 208) having an input comprising a location of a person and locations for equipment. As discussed above, the location may comprise geographical coordinates of users that are transmitted wirelessly from the user to geofence server 200. Location of equipment can be assumed to be the same location as the user if the user is assigned the equipment at the beginning of a shift. Logic circuitry (microprocessor 213) is provided for determining a type of equipment in proximity to the person and setting the geofence boundary based on the type of equipment in proximity to the person.

As discussed above, the geofence boundary surrounds a public-safety incident and the logic circuitry sets the geofence determining a geofence power, determining a resistance for the person, and setting the geofence boundary at a point where the geofence power and the resistance for the person are equal.

Figure 4:
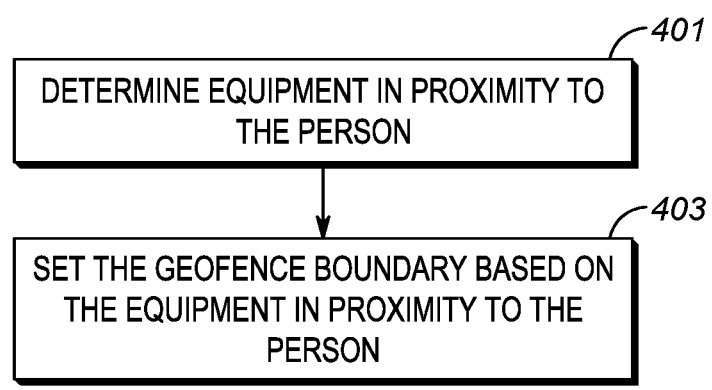
FIG. 4 is a flow chart showing operation of the geofence server of FIG. 2.

FIG. 4 is a flow chart showing operation of the geofence server of FIG. 2. In particular, the steps shown in FIG. 4, all of which are not necessary, describe a method for setting a geofence boundary for a person. The logic flow begins at step 401 where logic circuitry 213 determines a type of equipment in proximity to the person and sets the geofence boundary based on the type of equipment in proximity to the person (step 403).

As discussed above, the geofence boundary comprises a geographic boundary that is unique for each individual person. In addition, the step of determining the type of equipment in proximity to the person may comprise determining a location of the person, determining locations of the equipment, and determining the type of equipment in proximity to the person based on the location of the person and the locations of the equipment.

In another embodiment of the present invention the type of equipment in proximity to the person comprises the step of determining if the person is assigned the equipment. This may be information contained within database (memory 216).

As discussed above, the geofence boundary may surround a public-safety incident.

Also, as discussed above, the step of setting the geofence boundary comprises the steps of determining a geofence power, determining a resistance for the person, and setting the geofence boundary at a point where the geofence power and the resistance for the person are equal.

Figure 5:
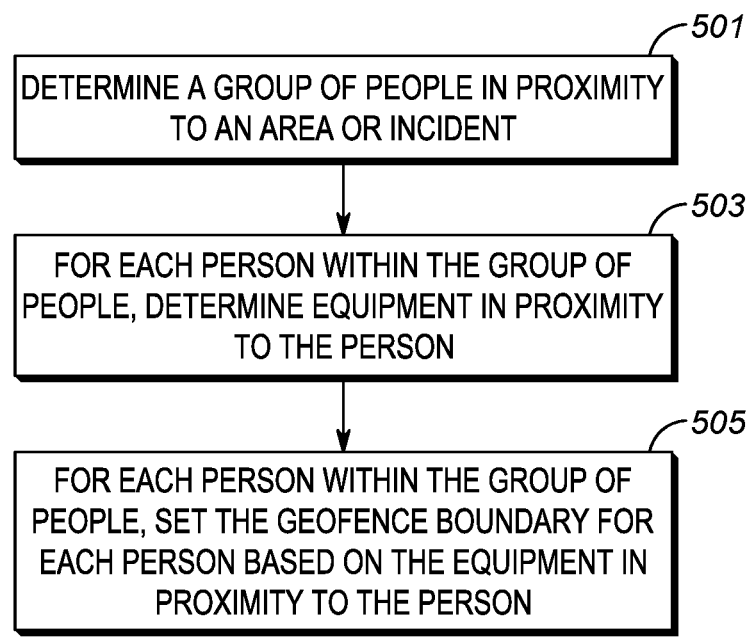
FIG. 5 is a flow chart showing operation of the geofence server of FIG. 2.

FIG. 5 is a flow chart showing operation of the geofence server of FIG. 2 in accordance with an alternate embodiment of the present invention. The logic flow begins at step 501 where logic circuitry 213 determines a group of people in proximity to an area or incident. The area or incident has a geofence surrounding the area or incident, and the geofence boundary varies for each person within the group of people.

At step 503, for each person within the group of people, logic circuitry 513 determines a type of equipment in proximity to the person, and for each person within the group of people, logic circuitry 213 sets the geofence boundary for each person based on the type of equipment in proximity to the person (step 505), such that a first person from the group of people has a first geofence boundary surrounding the area or incident, and a second person from the group of people has a second geofence boundary surrounding the area or incident.

When the first person has a first type of equipment in proximity to them and the second person has a second type of equipment in proximity to them, the first person has a geofence boundary farther from the area or incident than the second person.

Determining the type of equipment in proximity to the person may comprise the steps of determining a location of the person, determining locations of the equipment, and determining the type of equipment in proximity to the person based on the location of the person and the locations of the equipment.

Alternatively, the step of determining the type of equipment in proximity to the person may comprise the steps of determining equipment assigned to the person.

As discussed above, the step of setting the geofence boundary for a particular person comprises the steps of determining a geofence power, determining a resistance for the particular person, and setting the geofence boundary at a point where the geofence power and the resistance for the particular person are equal.

As one of ordinary skill in the art will recognize, logic circuitry 213 will determine the geofence boundary for each person, along with each person's location. When the person crosses the geofence, logic circuitry 213 will execute an appropriate action. For example, logic circuitry 213 may instruct transmitter (transceiver 208) to transmit an appropriate warning to the person.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for setting geofence boundaries associated with an incident to which users are responding, the method comprising:
   determining, by a computing device, whether each user responding to an incident possesses physical equipment selected from one or more of a gun-draw sensor, a body-worn camera, a wireless microphone, a smart watch, a police radio, a man-down sensor, a gas mask, a radioactivity detector, and a hazardous gas detector;
   setting, by the computing device, unique geofence boundaries centered at the incident to which the users are responding and assigned to each user based on the determined physical equipment in possession of each user such that at least a first user of the responding users is assigned a first unique geofence boundary at a first distance from the incident based on the determined physical equipment in possession of the first user and a second user of the responding users is assigned a second unique geofence boundary at a second distance from the incident different from the first distance based on the determined physical equipment in possession of the second user.

2. The method of claim 1, wherein the step of determining the physical equipment possessed by each user comprises accessing, by the computing device, a database to determine physical equipment selected from the one or more of the gun-draw sensor, the body-worn camera, the wireless microphone, the smart watch, the police radio, the man-down sensor, the gas mask, the radioactivity detector, and the hazardous gas detector assigned to each user.

3. The method of claim 1, wherein the step of determining the physical equipment possessed by each user comprises determining, by the computing device, if the physical equipment selected from the one or more of the gun-draw sensor, the body-worn camera, the wireless microphone, the smart watch, the police radio, the man-down sensor, the gas mask, the radioactivity detector, and the hazardous gas detector is detectable via wireless communication.

4. The method of claim 1, wherein setting the geofence boundaries comprises:
   determining, by the computing device, a geofence power as a function of a distance of each user from the center of the geofence;
   determining, by the computing device, a resistance for each person as a function of the determined physical equipment in possession of each user; and
   setting, by the computing device, each geofence boundary at a point where the geofence power and the resistance for the user are equal.

5. The method of claim 1, wherein the determining whether each user responding to the incident possesses physical equipment selected from one or more of a gun-draw sensor, a body-worn camera, a wireless microphone, a smart watch, a police radio, a man-down sensor, a gas mask, a radioactivity detector, and a hazardous gas detector further comprises determining whether each user responding to the incident possesses physical equipment selected from one or more of the gun-draw sensor, the body-worn camera, the man-down sensor, the gas mask, the radioactivity detector, and the hazardous gas detector.

6. The method of claim 1, wherein the determining whether each user responding to the incident possesses physical equipment selected from one or more of a gun-draw sensor, a body-worn camera, a wireless microphone, a smart watch, a police radio, a man-down sensor, a gas mask, a radioactivity detector, and a hazardous gas detector further comprises determining whether each user responding to the incident possesses physical equipment selected from one or more of the gun-draw sensor, the man-down sensor, the gas mask, the radioactivity detector, and the hazardous gas detector.

7. The method of claim 1, further comprising providing, by the computing device, one of a warning and alert to each user when the each user crosses the uniquely set geofence boundary assigned to that user.

8. The method of claim 1, wherein the first user has one piece of the physical equipment in their possession and the second user has two or more pieces of the physical equipment in their possession, and wherein the first user has the first unique geofence boundary farther from the incident than the second unique geofence boundary of the second user.

9. An apparatus for setting a geofence boundary associated with an incident to which users are responding, the apparatus comprising:
   a receiver having an input comprising physical equipment in possession of each user, the physical equipment selected from one or more of a gun-draw sensor, a body-worn camera, a wireless microphone, a smart watch, a police radio, a man-down sensor, a gas mask, a radioactivity detector, and a hazardous gas detector; and
   logic circuitry configured to set unique geofence boundaries centered at the incident to which the users are responding and assigned to each user based on the received physical equipment in possession of each user such that at least a first user of the responding users is assigned a first unique geofence boundary at a first distance from the incident based on the determined physical equipment in possession of the first user and a second user of the responding users is assigned a second unique geofence boundary at a second distance from the incident different from the first distance based on the determined physical equipment in possession of the second user.

10. The apparatus of claim 9, wherein the geofence boundary surrounds a public-safety incident.

11. The apparatus of claim 9, wherein the logic circuitry sets each geofence boundary by:
   determining a geofence power as a function of a distance of the user from the center of the geofence;
   determining a resistance for the user as a function of the determined physical equipment in possession of the user; and
   setting the geofence boundary at a point where the geofence power and the resistance for the user are equal.

12. The apparatus of claim 9, the receiver having the input comprising physical equipment in possession of the user, the physical equipment further selected from one or more of the gun-draw sensor, the body-worn camera, the man-down sensor, the gas mask, the radioactivity detector, and the hazardous gas detector.

13. The apparatus of claim 9, the receiver having the input comprising physical equipment in possession of the user, the physical equipment further selected from one or more of the gun-draw sensor, the man-down sensor, the gas mask, the radioactivity detector, and the hazardous gas detector.

14. The apparatus of claim 9, the logic circuitry further configured to provide one of a warning and alert to each user when the each user crosses the uniquely set geofence boundary assigned to that user.

15. The apparatus of claim 9, wherein the first user has one piece of the physical equipment in their possession and the second user has two or more pieces of the physical equipment in their possession, and wherein the first user has the first unique geofence boundary farther from the incident than the second unique geofence boundary of the second user.

\* \* \* \* \*